United States Patent [19]

Kira et al.

[11] Patent Number: 4,490,980
[45] Date of Patent: * Jan. 1, 1985

[54] GEOGRAPHICALLY POSITIONED, ENVIRONMENTAL, SOLAR HUMIDIFICATION ENERGY CONVERSION

[76] Inventors: Gene S. Kira, 7986 Amargosa Dr., Carlsbad, Calif. 92008; Jens O. Sorensen, P.O. Box 2274, Rancho Santa Fe, Calif. 92067

[*] Notice: The portion of the term of this patent subsequent to Nov. 8, 2000 has been disclaimed.

[21] Appl. No.: 473,273

[22] Filed: Mar. 8, 1983

[51] Int. Cl.³ .............................................. F03G 7/02
[52] U.S. Cl. .................... 60/641.8; 60/641.9; 126/433; 165/104.13; 165/104.34
[58] Field of Search .............. 60/641.8, 641.9, 641.11, 60/643, 645, 648, 670; 126/432, 433, 434, 435; 165/104.13, 104.34

[56] References Cited

U.S. PATENT DOCUMENTS 4,284,066  8/1981  Brow .............................. 126/434 X
4,413,476  11/1983  Kira et al. ........................ 60/641.8

FOREIGN PATENT DOCUMENTS 2024408  1/1980  United Kingdom ................ 126/433

Primary Examiner—Stephen F. Husar

[57] ABSTRACT

Air and water are provided in a solar collector and heated by the solar collector to provide warm humid air which is transported past a boiler in a closed cycle power system. The boiler is positioned at an elevation above that of the solar collector. A working fluid in the boiler of the power system is heated by the warm humid air, whereby the working fluid is pressurized and the warm humid air is cooled causing water vapor to condense from the air. The energy of the pressurized fluid is converted into a useful form of energy, thereby expanding the working fluid which is transported to a condensor of the closed cycle power system where the working fluid is cooled by water pumped from a lake. The cooled working fluid is recycled through the boiler. The water that is condensed from the humid air is collected and recycled through the solar collector, at least partly as a result of the low density of the rising warm air moving from the solar collector to the boiler in relation to the higher density of the descending cooled air moving from the boiler to the solar collector.

8 Claims, 3 Drawing Figures

GEOGRAPHICALLY POSITIONED, ENVIRONMENTAL, SOLAR HUMIDIFICATION ENERGY CONVERSION

FIELD OF THE INVENTION

The invention generally pertains to solar energy conversion and is particularly directed to large environmentally positioned systems, utilizing the natural geographical resources available.

CROSS REFERENCE TO RELATED APPLICATION

This application is cross referenced to a related co-pending application Ser. No. 156,274 filed on June 4, 1980 for Energy Conversion Derived from Temperature Differentials at Different Elevations, now U.S. Pat. No. 4,382,365, by the same co-inventors.

DISCUSSION OF PRIOR ART

Examples of prior art in the same field of invention are described in U.S. Pat. No. 3,436,908 to Van Delic for Solar Air Moving System, U.S. Pat. No. 3,894,393 to Carlson for Power Generation through Controlled Convection, U.S. Pat. No. 3,936,652 to Levine for Power System, U.S. Pat. No. 3,945,218 to Parker for Environment Control System, U.S. Pat No. 4,106,295 to Wood for Air Pressure Differential Energy System, and U.S. Pat. No. 4,143,516 to Long for Air-Water Power Generator.

The principle of the above patents to Carlson, Levine, Wood and Long all employ moist air or the air itself as the working fluid in the power system. The principle of the patent to Van Delic employs no power system at all, and the principle of the patent to Parker does not combine air with water nor employ a lake for cooling purposes.

None of the above mentioned patented systems employs a heat transfer of warm moist air to a working fluid; it should be mentioned that warm moist air has a very large internal heat energy content in relation to warm dry air.

OBJECTS OF THE INVENTION

Every year it is becoming increasingly more evident that man is quickly using up his supply of non-renewable fuels, and that the use of these non-renewable fuels progressively pollutes his environment; the last remaining non-renewable fuels seem to be the most polluting. Therefore, it is of urgent importance that cost efficient systems and methods of energy conversion from renewable sources be put to use in the near future, especially since large untraditional mechanisms often take many years for their implementation.

It is, therefore, the object of this invention to provide a cost efficient system and method of renewable energy conversion, which is non-polluting to the environment, and which can be implemented in a foreseeable future because it uses components the technology of which chiefly exists.

It is also an object of this invention to provide a system and method enabling the productive use of vast, arid desert areas which at present do not contribute to the economy of man.

It is also an object of this invention to provide a system of fresh water production.

It is also an object of this invention to provide a system and method of salt production.

The system is environmentally and geographically dependent, since necessary conditions include abundant sunshine and a large, topographically suitable area for the gas-filled solar collector.

SUMMARY OF THE INVENTION

The present invention discloses a system and a method of geographically positioned, environmental solar humidification energy conversion. The method includes the steps of:

(a) providing air in a solar collector;

(b) providing water in the solar collector;

(c) combining the provided air with the provided water in the solar collector to create humid air;

(d) heating the provided air, the provided water and/or the humid air by the solar collector to create warm humid air;

(e) transporting the warm humid air to a boiler of a closed cycle power system which is positioned at an elevation above that of the solar collector;

(f) providing a working fluid in the boiler of the power system;

(g) heating the working fluid in the boiler with the transported warm humid air whereby the working fluid is pressurized and the warm humid air is cooled, whereby some water vapor condenses;

(h) converting the energy of the pressurized working fluid to produce a useful form of energy, thereby expanding the working fluid;

(i) transporting the expanded working fluid to a condenser of the closed cycle power system;

(j) cooling the transported expanded working fluid in the condenser, whereby the working fluid condenses;

(k) recycling the cooled working fluid to provide said working fluid in the boiler of the power system; and (l) recycling the cooled air into the solar collector to provide said air in the solar collector at least partly as a result of the low density of the rising warm air moving from the solar collector to the boiler in relation to the higher density of the descending cooled air moving from the boiler to the solar collector.

BRIEF DESCRIPTION OF THE DRAWINGS

FIG. 1 is an aerial view of the first preferred embodiment where the "up" direction is perpendicular to the plane of the drawing sheet and in a direction toward the viewer.

FIG. 2 is a sectional side view of the first preferred embodiment taken through a plane indicated by section line 2—2 in FIG. 1.

FIG. 3 is a sectional view of the first preferred embodiment taken along a plane indicated by section line 3—3 in FIG. 1.

DESCRIPTION OF THE PREFERRED EMBODIMENTS

Figures 1, 2:
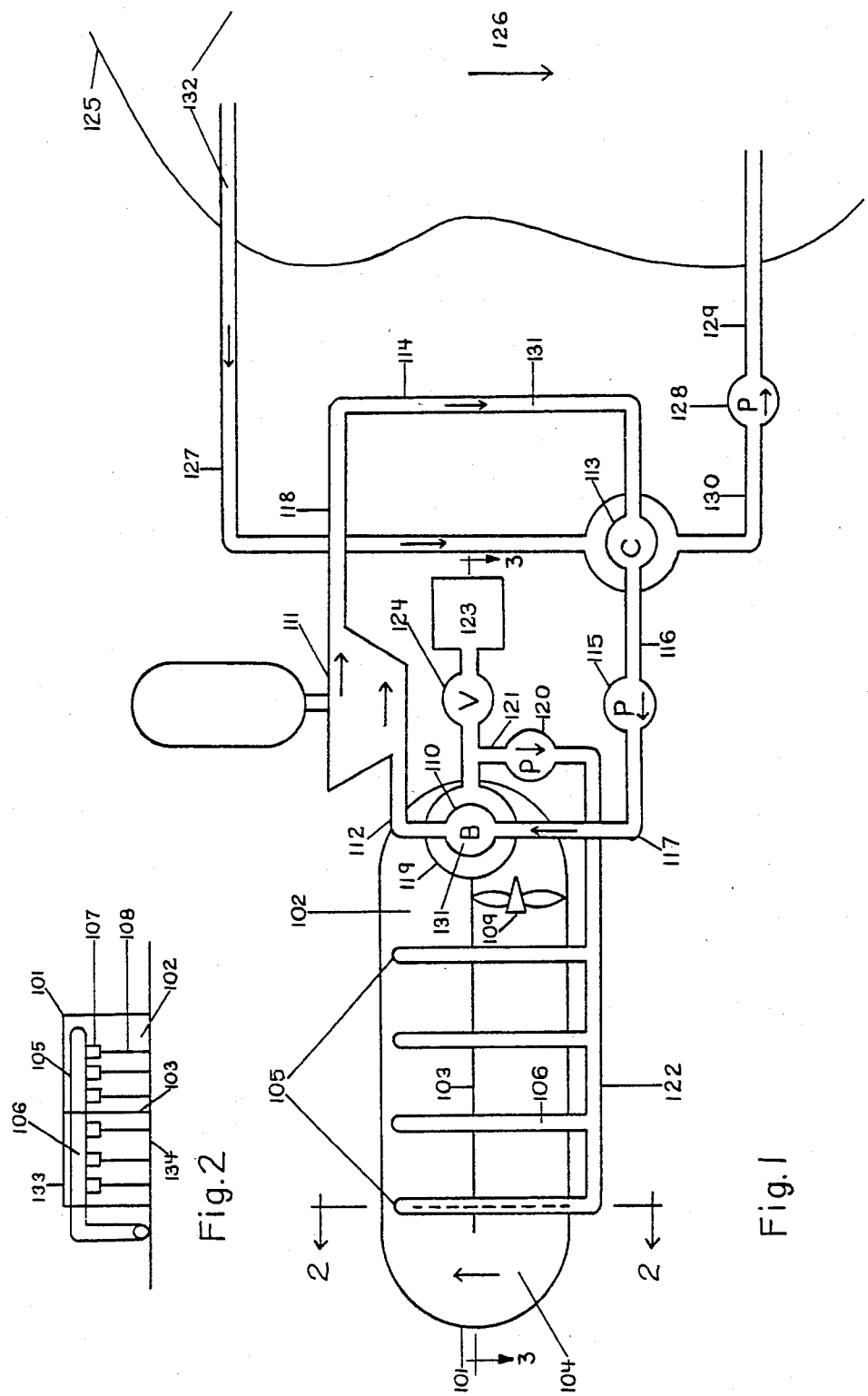
FIGS. 1, 2 and 3 are schematic diagrams of a preferred embodiment of Geographically Positioned, Environmental, Solar Humidification Energy Conversion Systems according to the present invention.
Figure 3:
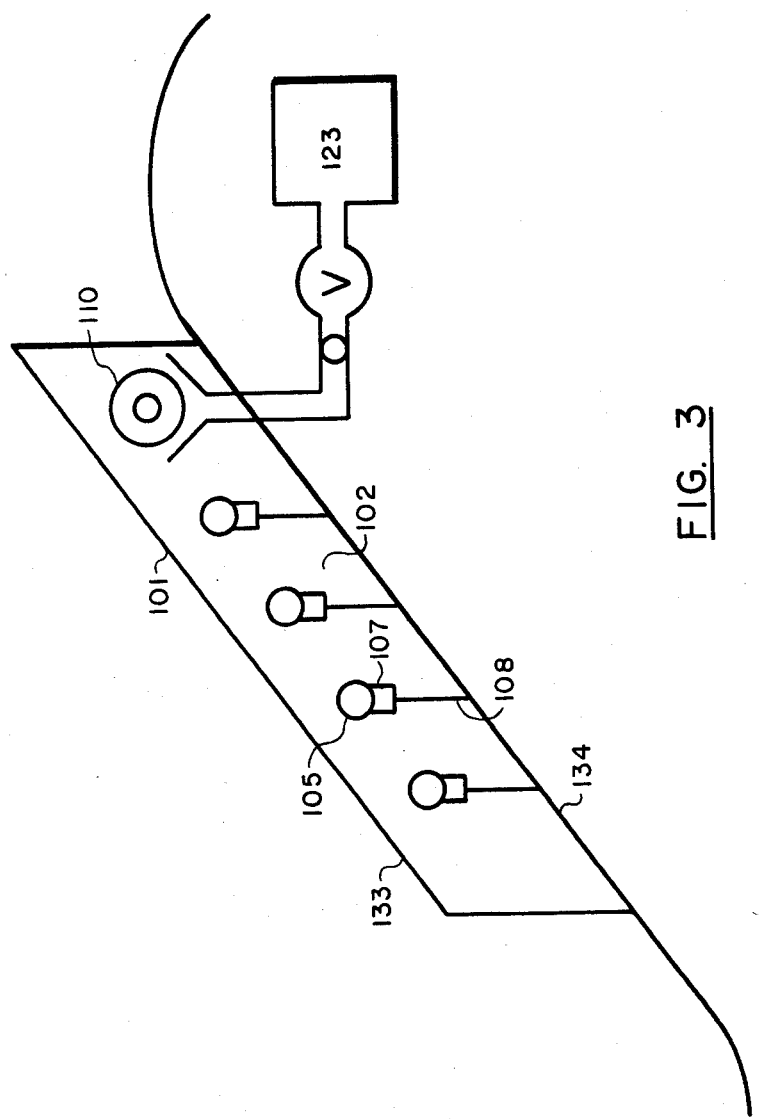

The system illustrated in FIGS. 1, 2 and 3 includes:

A solar collector 101, containing air 102, with a transparent roof 133, and a black floor 134. A central partition 103 in the solar collector 101 creates a closed circulatory air passage 104. A network of conduits 105 distributed water 106 in the solar collector 101. An array of emitters 107, similar in type to those used for agricultural irrigation, is attached to the network of conduits 105.

Absorbent filaments 108 with a large surface area, such as provided by knitting yarn are suspended in the air 102 down from an emitter 107, so that the lower end of the filament 108 contacts the floor 134.

A high volume, low pressure differential gas pump 109 is positioned across the closed circulatory air passage 104 in the solar collector 101. A boiler 110 is positioned in the solar collector.

A turbine generator 111 is connected by a conduit 112 to the boiler 110.

A condenser 113 is connected by a conduit 114 to the turbine 111.

A pump 115 is connected by a conduit 116 to the condenser 113 and by a conduit 117 to the boiler 110.

The boiler 110, turbine generator 111, condenser 113, pump 115, and the four conduits 112, 114, 116 and 117 make up a closed cycle power system 118 containing a working fluid 131 such as ammonia.

A condensed water collector 119 is positioned under the boiler 110.

A pump 120 is connected by a conduit 121 to the condensed water collector 119 and connected by a conduit 122 to the network of conduits 105.

An additive supplier 123 is connected through a valve 124 to the conduit 121, which connects the condensed water collector 119 with the pump 120. A lake 125 contains waste water 132 with a natural current 126. A supply conduit 127 connects the upstream portion of the lake 125 with the condenser 113.

A pump 128 is connected by a conduit 129 to the downstream portion of the lake 125 and connected by a conduit 130 to the condenser 113.

The boiler 110 and solar collector 101 are placed on a mountain side so that the boiler 131 is positioned at an elevation above that of the main part of the solar collector 101.

The operation of the system illustrated in FIGS. 1, 2 and 3 is as follows.

Air 102 is provided in the solar collector 101. Water 106 is provided in the network of conduits 105 in a manner to be described later. The provided water 106 is distributed through the network of conduits 105 to the array of emitters 107. The distributed water is drip or trickle emitted by the emitters 107 whereby the emitted water travels down the absorbent filaments 108 where each filament 108 is connected to an emitter 107. Each filament 108 is suspended in the air 102 from the emitter 107 to which it is connected so that the lower end of the filament 108 contacts the floor 134. The emitted water is absorbed by the filaments 108, and moisture from the floor 134 is also absorbed by the filaments 108 so that the filaments 108 behave like wicks.

The absorbed water is evaporated from the filaments 108 thereby combining the provided air 102 with the provided water 106 in the solar collector 101 to create humid air.

The solar collector 101 heats the provided air 102 and the humid air by solar radiation and also heats the provided water 106 in the network of conduits 105 by solar radiation on the network of conduits 105 which is black in color, resulting in the creation of warm humid air. The gas pump 109 circulates the air around in the closed circulatory air passage 104 whereby air constantly is provided in the air passage 104 and whereby warm humid air is transported to the boiler 110.

The circulation of the air is enhanced as a result of the low density of the rising warm air moving from the solar collector 101 to the boiler 110 in relation to the higher density of the descending cooled air moving from the boiler 110 to the solar collector 101. In some cases this circulation which is caused by density differences of the air may be so large that the gas pump 109 is unnecessary.

A working fluid 131 is provided in the boiler 110 of the power system 118 in a manner later described. The working fluid 131 in the boiler 110 is brought into a heat exchange relationship with the circulated warm humid air, whereby the working fluid 131 is heated causing it to become pressurized, at the same time as the warm humid air is cooled and some water vapor condenses. The pressurized working fluid 131 is conducted from the boiler 110 through conduit 112 to the turbine generator 111 to produce electric power, whereby the working fluid is expanded.

The expanded working fluid 131 is conducted through conduit 114 to a condenser 113 of the closed cycle power system 118.

Cool waste water 132 is pumped from the lake 125 via the conduit 127, via the condenser 113 and via conduit 130 by the pump 128, and is discarded back into the lake 125 at a location which is downstream of the supply conduit 127 so that the natural current 126 prevents the discarded water from getting mixed with the cool water which is inducted into the supply conduit 127. The conducted expanded working fluid 131 is brought in heat exchange relationship at the condenser 113 with the waste water, whereby the working fluid 131 cools and condenses, and the waste water is heated. The cooled working fluid 131 is recirculated by pump 115 from the condenser 113 via conduits 116 and 117 to the boiler 110 thereby providing the working fluid 131 in the boiler 110.

The condensed water vapor falls into the condensed water collector 119 and is pumped by pump 120 via conduits 121 and 122 to the network of conduits 105, whereby the condensed water vapor is collected and recycled to the network of conduits 105. Periodically the condensed water is treated with a surfactant such as a detergent and a dye by opening valve 124, thereby adding the surfactant and dyes from additive supplier 123. The surfactant aids the evaporation process and the dye is black, which keeps the filaments 108 a dark color for absorption of solar radiation.

While the above descriptions contain many specificities, these should not be construed as limitations on the scope of the invention, but rather as an exemplification of the preferred embodiments thereof. Many other variations are possible, for example systems according to the invention may be used where all the circulation of the air is caused by density differences of the air, so that no gas pumping is necessary, or only used for starting up the circulation of the air. Accordingly, the scope of the invention should be determined not by the embodiments illustrated, but by the appended claims and their legal equivalents.

We claim:

1. A method of geographically positioned, environmental solar humidification energy conversion comprising the steps of:
   (a) providing air in a solar collector;
   (b) providing water in the solar collector;
   (c) combining the provided air with the provided water in the solar collector to create humid air;

(d) heating the provided air, the provided water and/or the humid air by the solar collector to create warm humid air;

(e) transporting the warm humid air to a boiler of a closed cycle power system which is positioned at an elevation above that of the solar collector;

(f) providing a working fluid in the boiler of the power system;

(g) heating the working fluid in the boiler with the transported warm humid air whereby the working fluid is pressurized and the warm humid air is cooled, whereby some water vapor condenses;

(h) converting the energy of the pressurized working fluid to produce a useful form of energy, thereby expanding the working fluid;

(i) transporting the expanded working fluid to a condenser of the closed cycle power system;

(j) cooling the transported expanded working fluid in the condenser, whereby the working fluid condenses;

(k) recycling the cooled working fluid to provide said working fluid in the boiler of the power system; and (l) recycling the cooled air into the solar collector to provide said air in the solar collector at least partly as a result of the low density of the rising warm air moving from the solar collector to the boiler in relation to the higher density of the descending cooled air moving from the boiler to the solar collector.

2. A method according to claim 1, comprising the additional step of:

(m) collecting the condensed water vapor which is warm fresh water; and wherein step (b) comprises the step of recycling the collected water in the solar collector.

3. A method according to claim 2 comprising the additional step of:

(n) recycling the collected warm fresh water into the solar collector to provide at least a part of said water in the solar collector.

4. A method according to claim 1 wherein the boiler and/or the solar collector are placed on a hill or mountain side.

5. A system for geographically positioned, environmental solar humidification energy conversion comprising:

means for providing air in a solar collector;

means for providing water in the solar collector;

means for combining the provided air with the provided water in the solar collector to create humid air;

a solar collector for heating the provided air, the provided water and/or the humid air to create warm humid air;

means for transporting the warm humid air to a boiler of a closed cycle power system which is positioned at an elevation above that of the solar collector;

a power system for containing a working fluid;

a boiler for heating the working fluid with the transported warm humid air whereby the working fluid is pressurized and the warm humid air is cooled, whereby some water vapor condenses;

means for converting the energy of the pressurized working fluid to produce a useful form of energy, thereby expanding the working fluid;

means for transporting the expanded working fluid to a condenser of the closed cycle power system;

a condenser for cooling the transported expanded working fluid whereby the working fluid condenses;

means for recycling the cooled working fluid to provide said working fluid in the power system; and means for recycling the cooled humid air into the solar collector to provide said air in the solar collector at least partly as a result of the low density of the rising warm air moving from the solar collector to the boiler in relation to the higher density of the descending cooled air moving from the boiler to the solar collector.

6. A system according to claim 5 additionally comprising:

means for collecting the condensed water vapor which is warm fresh water; and wherein the means for providing water in the solar collector comprises means for recycling the collected water in the solar collector.

7. A system according to claim 6 wherein the water providing means additionally comprises:

means for recycling the collected warm fresh water into the solar collector to provide at least a part of said water in the solar collector.

8. A system according to claim 5 wherein the boiler and/or the solar collector are placed on a hill or mountain side.

* * * * *